US012782673B2

(12) United States Patent
Guastadini

(10) Patent No.: US 12,782,673 B2
(45) Date of Patent: Nov. 3, 2026

(54) ORIENTABLE FOCUS FOR EXTENSION OF READING FIELD

(71) Applicant: Datalogic IP Tech S.r.l., Lippo di Calderara di Reno (IT)

(72) Inventor: Fabrizio Guastadini, Bologna (IT)

(73) Assignee: Datalogic IP Tech S.R.L., Lippo di Calderara di Reno (IT)

( * ) Notice: Subject to any disclaimer, the term of this patent is extended or adjusted under 35 U.S.C. 154(b) by 1155 days.

(21) Appl. No.: 17/834,272

(22) Filed: Jun. 7, 2022

(65) Prior Publication Data

US 2023/0393368 A1 Dec. 7, 2023

(51) Int. Cl.
*G02B 7/08* (2021.01)
*G03B 13/36* (2021.01)

(52) U.S. Cl.
CPC ............... *G02B 7/08* (2013.01); *G03B 13/36* (2013.01)

(58) Field of Classification Search
None
See application file for complete search history.

(56) References Cited

U.S. PATENT DOCUMENTS 6,594,450 B1 7/2003 Kao
8,731,389 B2 5/2014 Gainer
9,001,224 B2 4/2015 Moriya et al.
9,684,184 B2 6/2017 Miller et al.
11,934,033 B2 * 3/2024 Lee ...................... G02B 27/646
2010/0086294 A1 * 4/2010 Lim ....................... G03B 13/36 396/144
2020/0099832 A1 * 3/2020 Chang .................... H04N 23/55

FOREIGN PATENT DOCUMENTS

EP 2624042 B1 4/2016
WO 2020/021578 A1 1/2020

* cited by examiner

*Primary Examiner* — Stephone B Allen
*Assistant Examiner* — Tamara Y. Washington
(74) *Attorney, Agent, or Firm* — Shook, Hardy & Bacon L.L.P.

(57) ABSTRACT

An imaging device has a focusing device flanked by electromagnets such that a magnetic levitation between the electromagnets and permanent magnets in the focusing device cause the focusing device to rotate about an axis. This rotation causes the optical axis of the focusing device to read an extended reading field beyond the ordinary reading field when the focusing device is in a balanced magnetic levitation position.

20 Claims, 12 Drawing Sheets

ORIENTABLE FOCUS FOR EXTENSION OF READING FIELD

CROSS-REFERENCE TO RELATED APPLICATIONS

This application herein incorporates International Publication No. WO 2020/021578 in its entirety.

BACKGROUND

Currently, to have a large reading field, two or more parallel lectors or optical readers or image readers are needed. If these are not available, a moving single lector (or optical reader or image reader) with a complicated handling system must be implemented. Such complicated handling system is expensive and slow.

The inventors have appreciated that a solution is needed that can extend a reading field with one lector or optical reader or that can extend a reading field without a complicated handling system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The technical solution at the basis of the present invention is that of not only providing a focus device alternative to the ones already known and that ensure quickly reaching the desired focusing position but also providing an extended reading field and having a device that can focus at all areas of the reading field and the extended reading field.

The disclosed system described herein is an electromagnetic autofocus with cushioning for imager devices and applications where it is necessary to quickly move an optical unit along a rectilinear axis and orient it to extend a reading field. The device consists of a translating component made by a hollow cylindrical support in aluminum that houses a lens, two sliding bushings and two circular motion coils electrically connected to two conductive springs. Further, the device includes a guide inside which the translating component slides, two permanent magnets that envelop the guide, a spacer, two limits of motion, a plastic support, a balancing mass, and a printed circuit board with an image sensor. Four fixed electromagnets are mounted outside of the device.

The orientable autofocus allows the imaging device to obtain an extension of a reading field with only a lector (i.e. reader). The orientation is quick and the cost to implement the imaging device is low.

In a first aspect, an imaging device is provided that includes a focusing device. The focusing device includes an optical assembly. The optical assembly is configured to have an optical lens system including one or more lenses made from a hard transparent substance or made from a liquid lens system including an optical liquid material. The optical assembly collects an image located at a distance at a reading field of the imaging device and transfers the image to an acquisition sensor in the focusing device. The focusing device is configured to be orientable about an axis in positions. When the focusing device is in one position, the optical axis of the optical assembly in the focusing device is perpendicular to the reading field. When the focusing device is rotatable about the axis in another position, the optical axis moves and creates an extended reading field from the movement of the optical axis. The extended reading field is the area adjacent to (or on either side of) the reading field. Electromagnets are located exterior to the focusing device. At least two magnets are placed around the optical assembly. When the optical axis of the optical assembly in the focusing device is oriented perpendicular to the reading field, the optical assembly achieves a fixed focus. Electromagnets and at least two magnets create a magnetic levitation, which causes a rotation of the focusing device. When the magnetic levitation causes the rotation of the focusing device at the axis, the rotation of the focusing device yields the extended reading field and the focusing device achieves an orientable focus in the adjacent areas to the reading field.

In another aspect, a method for creating an imaging device with an orientable focus for extension of a reading field is provided that includes configuring a focusing device in the imaging device with an optical assembly that has a lens system or a liquid lens system. Through the optical assembly, an image is captured located at a distance at a reading field of the focusing device. The optical assembly is oriented to extend beyond the reading field, which is perpendicular to an optical axis of the optical assembly. An extension of the reading field of the focusing device comprises rotating the focusing device about an axis. A plurality of electromagnets is located in proximity to the optical assembly. At least two magnets are placed around the optical assembly, where the at least two magnets have opposite polarities. A line of sight of the focusing device is oriented perpendicular to the reading field to achieve a fixed focus. A magnetic levitation is created between the plurality of electromagnets and at least the two magnets. The magnetic levitation causes a rotation of the focusing device at the axis. A rotation of the focusing device yields an extension to the reading field and achieves an orientable focus in the extended areas beyond the reading field.

In yet another aspect, an imaging device has an autofocus and has a focusing device that pivots so as to extend a reading field located at a distance. A pair of ring magnets is configured to radially magnetize with opposite polarities. A ring spacer is located between the pair of ring magnets. The pair of ring magnets and the ring spacer form a first cylindrical shape. The pair of ring magnets is configured to attach to an exterior of a cylindrical-shaped guide. The pair of ring magnets and the ring spacer are adjacent to the cylindrical-shaped guide. A motion coil is located adjacent to an interior of the cylindrical-shaped guide. The motion coil is in a second cylindrical shape. A sliding bushing is adjacent to the motion coil and located adjacent to the interior of the cylindrical-shaped guide. The motion coil is attached to a cylindrical support that is located to the interior of the motion coil. The cylindrical support is also located to the interior of the sliding bushing and includes a lens. The sliding bushing is attached to one end of conductive springs, and the other end of the conductive springs is attached to the focusing device in proximity to an image sensor. The sliding bushing and the motion coil move in a direction along the interior of the cylindrical-shaped guide when the motion coil receives an electric current that passes through the conductive springs. When the sliding bushing and the motion coil move, the cylindrical support including the lens also moves. The sliding bushing, the motion coil, and the cylindrical support with the lens move together as a unit. An amount of movement of the unit aids in a focus of the reading field when captured at the image sensor. A magnetic field crosses the pair of ring magnets in a direction orthogonal to the movement of the unit. Electromagnets are configured to be located at an exterior of the first cylindrical shape of the pair of ring magnets and are also located in proximity to the pair of ring magnets such that magnetic levitation occurs between the electromagnets and the pair of ring magnets. Each of a first pair of electromagnets is located on one side of the pair of ring magnets and each of a second pair of electromagnets is located on the other side of the pair of ring magnets. When magnetic levitation is balanced or even, the first pair of electromagnets and the second pair of electromagnets are equidistant and are placed in a fixed position. The focusing device achieves a fixed focus on the reading field. When the magnetic levitation changes, the change of magnetic levitation causes the focusing device to move and rotate about an axis to the desired position, which is maintained through the adjustment of the current that passes in the electromagnets. The focusing device is in a rotated position with an orientable focus on an extended reading field adjacent to the reading field.

In a final another aspect, an imaging device has an autofocus and has a focusing device that pivots so as to extend a reading field located at a distance. A pair of ring magnets is configured to radially magnetize with opposite polarities. A ring spacer is located between the pair of ring magnets. The pair of ring magnets and the ring spacer form a first cylindrical shape. The pair of ring magnets is configured to attach to an exterior of a cylindrical-shaped guide. The pair of ring magnets and the ring spacer are adjacent to the cylindrical-shaped guide. The interior of the cylindrical-shaped guide includes a liquid lens system. A magnetic field crosses the pair of ring magnets in a direction orthogonal to the movement of the unit. Electromagnets are configured to be located at an exterior of the first cylindrical shape of the pair of ring magnets and are also located in proximity to the pair of ring magnets such that magnetic levitation occurs between the electromagnets and the pair of ring magnets. Each of a first pair of electromagnets is located on one side of the pair of ring magnets and each of a second pair of electromagnets is located on the other side of the pair of ring magnets. When magnetic levitation is balanced or even, the first pair of electromagnets and the second pair of electromagnets are equidistant and are placed in a fixed position. The focusing device achieves a fixed focus on the reading field. When the magnetic levitation changes, the change of magnetic levitation causes the focusing device to move and rotate about an axis to the desired position, which is maintained through the adjustment of the current that passes in the electromagnets. The focusing device is in a rotated position with an orientable focus on an extended reading field adjacent to the reading field.

BRIEF DESCRIPTION OF THE DRAWINGS

The present invention is illustrated by way of example and not limitation in the accompanying figures in which like reference numerals indicate similar elements and in which.

DETAILED DESCRIPTION

The subject matter of aspects of the present invention is described with specificity herein to meet statutory requirements. However, the description itself is not intended to limit the scope of this patent.

Embodiments of the invention includes an imager device or industrial camera that includes a focus lens system. The focus lens system is capable of being oriented in order to extend the reading field of the imager device. In one embodiment, the imager device includes four fixed electromagnets and two ring permanent magnets. The two ring permanent magnets are radially placed around a barrel lens and magnetized with opposite polarities. As the focus lens system is oriented, the focus orientation around a rotation axis is achieved by the magnetic attraction or magnetic repulsion forces (magnetic levitation) between the four fixed electromagnets and the two ring permanent magnets. In embodiments, autofocus is a preferred embodiment, but a non-autofocus optical assembly can be implemented.

Herein, the expressions “axial,” “axially,” and similar expressions refer to a direction substantially parallel to the optical axis, while “radial,” “radially” and similar expressions refer to a direction substantially perpendicular to the optical axis.

Autofocus is well known in vision systems. U.S. Pat. No. 8,731,389 B2 from COGNEX is an example: “[0008] This invention overcomes disadvantages of the prior art by providing an electro-mechanical auto-focus function for a smaller-diameter lens type.”

Figure 1:
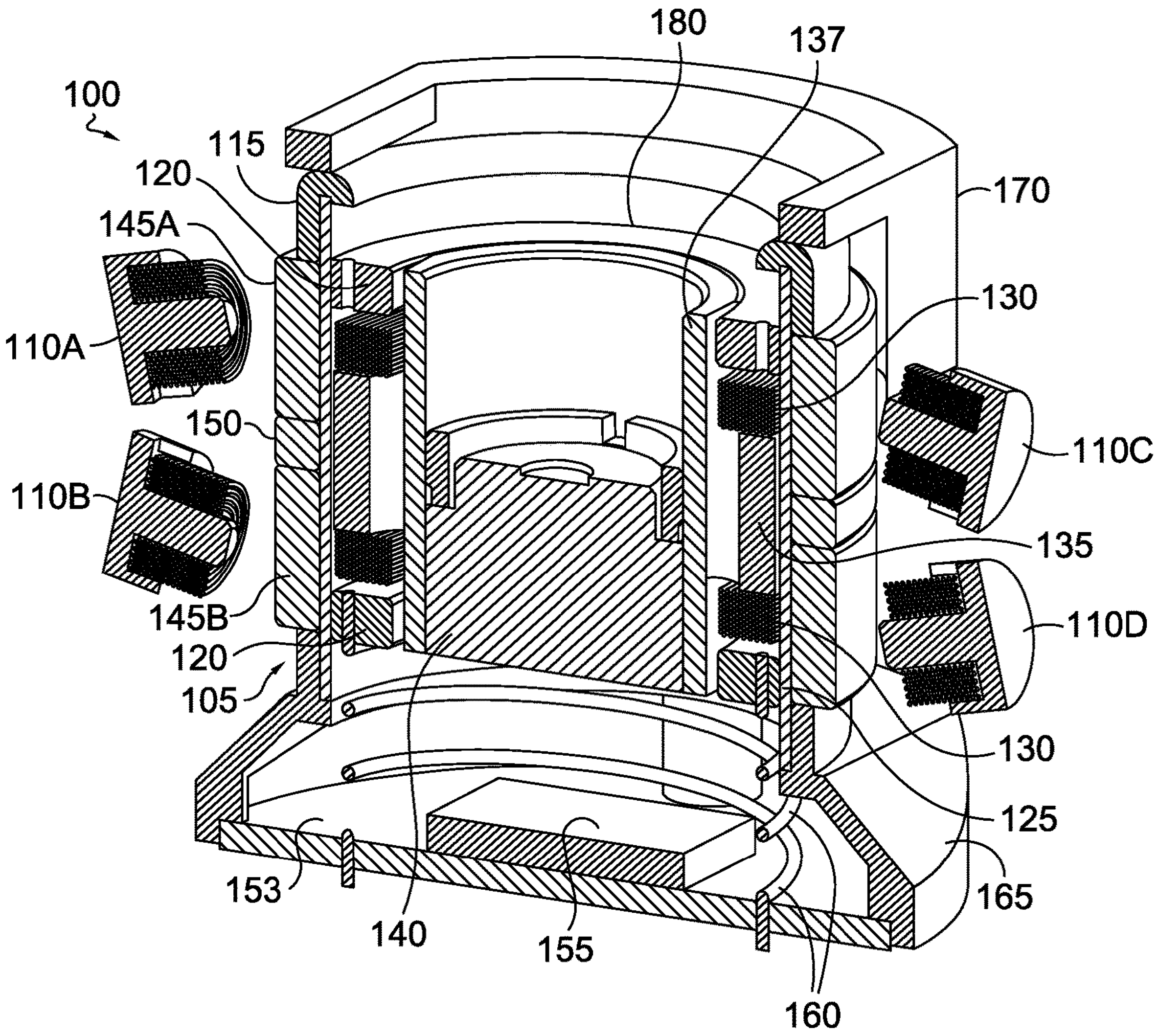
FIG. 1 is a cross-sectional view of an imaging device, implemented in accordance with an embodiment of the present invention.

Autofocus capability can be implemented by means of liquid lens or by means of electro-mechanical movements of lenses. Embodiments of the present invention disclose lens, balancing mass, rubber, sliding bushing, conductive spring, and motion coil. A similar approach, based on the exploitation of electromagnetic actuator, is described in U.S. Pat. No. 6,594,450 B1 from INTELLECTUAL VENTURES: "[0021] Please refer to FIG. 1 showing a perspective view of an auto-focus mechanism 10 according to the present invention. The auto-focus mechanism 10 includes a first hollow cylinder 12 attached to a frame (ref. 14, FIG. 2a), a first lens 16 also attached to the frame, an insulated metal wire wound around the cylinder 12 forming a coil 18, and a second hollow cylinder 20 holding a second lens 22. The second cylinder 20 fits over the first cylinder 12 and the coil 18 and is movable along the central axis of the first cylinder 12. The first and second lenses 16, 22 are also aligned on the central axis of the first cylinder 12. The first and second cylinders 12, 20 are mechanically connected by an elastic member such as a spring (ref. 24, FIG. 2a). The second cylinder 20 is made of metal, preferably a metal with high magnetic permeability such as iron, or magnetized iron or other permanent magnet material. The coil 18 is a linear coil of insulated conductor capable of being energized by a power source (not shown) to conduct a current. The coil 18 and second cylinder 20 form a solenoid-type device (e.g. electromagnetic valve). The auto-focus mechanism 10 is installed in a camera such as a film-based or digital camera. The first and second lenses 16, 22 work in conjunction to focus light from a subject to be photographed onto a photographic medium such as a photographic film or a charge-coupled device (CCD), the distance between the first and second lenses 16, 22 determining the focal length of the auto-focus mechanism 10."

Typical industrial application vision system installations are based on a set of fixed installed cameras, each of them being a camera with an autofocus property and each one being devoted to frame its reading field.

European Patent No. EP2624042 B1 from COGNEX, for example, proposes a system and method for expansion of a field of view in a vision system by means of a set of mirrors that transmit light from a scene in respective different partial fields of view. "[0003] A common use for ID readers is to track and sort objects moving along a line (e.g. a conveyor) in manufacturing and logistics operations. The ID reader can be positioned over the line at an appropriate viewing angle to acquire any expected IDs on respective objects as they each move through the field of view. The focal distance of the reader with respect to the object can vary, depending on the placement of the reader with respect to the line and the size of the object. That is, a larger object may cause IDs thereon to be located closer to the reader, while a smaller/flatter object may contain IDs that are further from the reader. In each case, the ID should appear with sufficient resolution to be properly imaged and decoded. Thus, the field of view of a single reader, particularly in with widthwise direction (perpendicular to line motion) is often limited. Where an object and/or the line is relatively wide, the lens and sensor of a single ID reader may not have sufficient field of view in the widthwise direction to cover the entire width of the line while maintaining needed resolution for accurate imaging and decoding of IDs. Failure to image the full width can cause the reader to miss IDs that are outside of the field of view. [0004] There are several techniques that can be employed to overcome the limitation in field of view of a single ID reader, and expand the systems overall field of view in the widthwise direction. For example, one can employ multiple ID readers/cameras focused side by side to fully cover the width of the line. This is often an expensive solution as it requires additional hardware and optics. Alternatively, a line-scan system with inherently wider FOV can be employed."

Embodiments of the invention propose to solve the problem by exploiting magnetic levitation (magnetic attraction/repulsion forces). Also, embodiments of the invention disclose an automatic orientation of a camera in order to augment the reading field.

Japanese Patent No. JP09043663 A discloses a vision system that is exploited for image stabilization purposes: "[0001] The present invention, a video camera using the magnetic levitation of the camera shake correction device and a method thereof according to the present invention, more specifically, to an outer side of the fixed iron core of the lens barrel and a camera respectively corresponding to the inner side of the electromagnets in such a manner that, when the camera shake correction mode of a predetermined amount of current to the electromagnet assembly and the camera lens and the lens barrel from the floating (rise), the image shake caused by camera shake can be automatically corrected using the magnetic levitation of a video camera-shake correction apparatus and a related method."

U.S. Pat. No. 9,684,184 B2 discloses an actuator device for stabilizing the optical image of a lens assembly with respect to an image sensor in a camera. The lens assembly is movable with respect to a support structure which supports the device. It is provided a first electrical winding for the autofocus and a second electrical winding for stabilizing the optical image, as well as a plurality of magnets. The two windings are fixed to the support structure, while the magnets are fixed to the lens assembly. Through the adjustment of the current that passes in the two windings, the lens assembly is focused and the optical image is stabilized. "[ABS]: the actuator module further includes a plurality of trapezoidal magnets affixed to the lens assembly structure for magnetic interaction with one or more of the one or more optical image stabilization coils and the one or more autofocus coils."

U.S. Pat. No. 9,001,224 B2 discloses a device for guiding a lens-holder that corrects the optical image in case of vibrations of the camera. The lens-holder is mobile with respect to a support structure of the device. Thus, provided is a first electrical winding for the autofocus fixed to the lens-holder, a second electrical winding for the correction of vibrations fixed to the support structure, and a permanent magnet also fixed to the support structure. Through the adjustment of the current that passes in the two windings, the lens-holder is focused and the optical image is corrected.

None of the documents found, alone, discloses all the features of the invention. A combination of the references does not lead to the implementation proposed by embodiments of the invention.

PCT Publication No. WO2020/021578 A1 discloses a device for focusing a light beam. It also discloses that the cushioning of the translating group is obtained by coupling the elastic springs and the force generated by the electric current induced in a hollow cylindrical support. The WO2020/021578 publication is incorporated herein in its entirety.

A cross-section view of an imaging device 100 is shown in FIG. 1 where the opening to imaging device 100 is at the top. Imaging device 100 has a focusing device 105 flanked by electromagnets 110A, 110B, 110C, and 110D, which can be fixed in position in some embodiments. Focusing device 105 comprises an optical focusing assembly that typically comprises at least one focusing lens or one focusing mirror. Such lens or mirror is intended to focus a light beam at a predetermined focusing distance that corresponds to a distance between the optical focusing assembly and an imaging sensor.

Focusing device 105 has abutment rings 115A and 115B that are used to limit the motion of sliding bushings 120. Sliding bushings 120 move in a linear direction along a guide 125. Sliding bushings 120 can be made from a variety of materials including polyoxymethylene (POM), polytetrafluorethylene (PTFE), polyamide, and polyethylene (PE).

Guide 125 has a cylindrical shape and is usually made of stainless steel, but can also be made of other materials. Guide 125 has an axial cavity in which an assembly formed by the optical assembly, sliding bushings 120, motion coils 130, and a support 135 are slidingly housed. Guide 125 substantially acts as a sliding bearing.

Focusing device 105 also includes motion coils 130, which are usually made of copper wire. Support 135 is adjacent to motion coils 130 and can be hollow and cylindrical in shape. Support 135 is used to provide structural support for lens 140, sliding bushings 120, and motion coils 130. Support 135 is usually made of aluminum, but can be made of another light-weight material.

As one can see in FIG. 1, sliding bushings 120, guide 125, motion coils 130, and support 135 have a cylindrical shape in order to hold and/or support an optical assembly that includes lens 140. Lens 140 can include one or more optical lens that have a concave or convex shape. Sliding bushings 120, guide 125, motion coils 130, support 135 and lens 140 can be replaced by a liquid lens system as described with reference to FIGS. 6 and 7. One of ordinary skill in the art understands that the use of the liquid lens system reduces the need for moveable or electromechanical parts, which may be found in the use of optical lenses.

Surrounding the cylindrical shape of the optical assembly, sliding bushings 120, guide 125, motion coils 130, and support 135 are magnets 145A and 145B, which are separated by a spacer 150. As one of ordinary skill in the art understands, the arrangements of components in FIG. 1 are exemplary and the components can be arranged in other configurations without departing from the invention. Magnet 145A may be positioned towards a north position, which may be the opening or top of imaging device 100. Magnet 145A can be referred to as a North Pole magnet and is usually made of sintered neodymium iron boron. However, as one understands, other types of magnets could be used including samarium cobalt (SmCo), alnico, and ceramic or ferrite. Magnet 145B can be referred to as a South Pole magnet and has the same properties as magnet 145A. In some embodiments, magnets 145A and 145B can be ring permanent magnets and will have opposite polarities. Spacer 150 is used to separate magnets 145A and 145B, and is usually made of plastic resin in some embodiments. However, other non-magnetic materials may be used in the place of plastic resin for spacer 150.

Electromagnets 110A, 110B, 110C, and 110D are located in pairs on opposite sides of focusing device 105 near, but not touching magnets 145A and 145B. Electromagnets 110A, 110B, 110C, and 110D can be made of copper wire and iron, but can also be made of other conductive and ferromagnetic materials.

At the closed or south end of focusing device 105, a printed circuit 153 is located and holds an image sensor 155, which captures an image that passes through the optical assembly. Also, within focusing device 105, conductive springs 160 attach at one end to printed circuit 153 and attach at the other end to sliding bushing 120. When sliding bushings 120 move in the linear direction along guide 125, conductive springs 160 expand and contract. The movement of sliding bushings 120 also includes the movement of motion coils 130, support 135, lens 140 and the optical assembly moving as one unit. Conductive springs 160 can be made of copper-beryllium wire, but other materials could be used to function as a conductive spring.

Conductive springs 160 are housed inside to the interior of guide 125 and are operatively interposed between the optical assembly and printed circuit 153.

Focusing device 105 also includes an autofocus support 165 and a balancing mass 170. Autofocus support 165 may be made of plastic resin or other material. Balancing mass 170 is used to act as a counterbalance when focusing device 105 pivots or rotates about an axis.

For the sake of ease, sliding bushings 120, motion coils 130, support 135, and the optical assembly with lens 140 may be referred to collectively as a moving mechanism unit 180. Similar to earlier discussions about sliding bushings 120, moving mechanism unit 180 moves in a linear direction in either direction along guide 125. Moving mechanism unit 180 and conductive springs 160 are movable with respect to the remainder of focusing device 105. The ring permanent magnets 145A and 145B are radially magnetized with opposite polarities. The magnetic field crosses the motion coils 130 in a direction orthogonal to the linear direction along guide 125 and closes in the air. The motion coils 130 are powered with opposite electric currents by means of the conductive springs 160. Therefore a Lorentz force is generated in a linear direction along guide 125 causing moving mechanism unit 180 to move back and forth and conductive springs 160 expand and contract. The amount of movement of moving mechanism unit 180 can be determined by the amount of electric current applied to coils 130 by means of the conductive springs 160. However, moving mechanism unit 180 is limited in its movement by abutment rings 115A and 115B. Abutment rings 115A and 115B acts as a buffer or stop to prevent the moving mechanism unit from extending beyond a minimum position or a maximum position.

Figure 2:
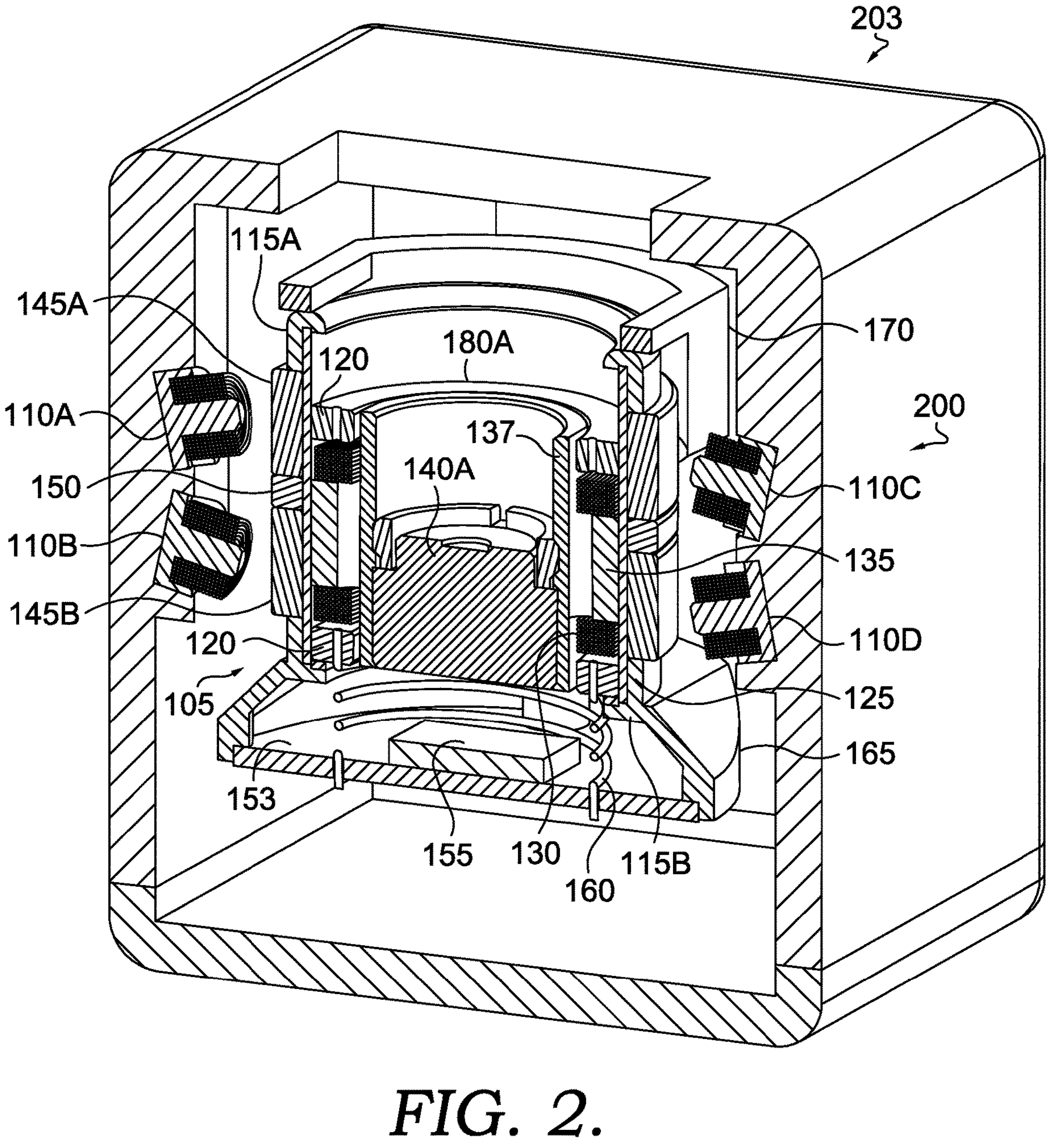
FIG. 2 is a cross-sectional view of a housing containing an imaging device with a translating lens in a minimum position, implemented in accordance with an embodiment of the present invention.

Turning now to FIG. 2, imaging device 200 is located in a housing 203. Housing 203 may include a camera, optical code reader, vision sensor, laser scanner, or similar device. Imaging device 200 is the same as imaging device 100 except that imaging device 200 has a translating lens 140A and moving mechanism unit 180A. Moving mechanism unit 180A is located in a minimum position touching an abutment ring 115B. In the minimum position, moving mechanism unit 180A is at its farthest distance from abutment ring 115A.

Figure 3:
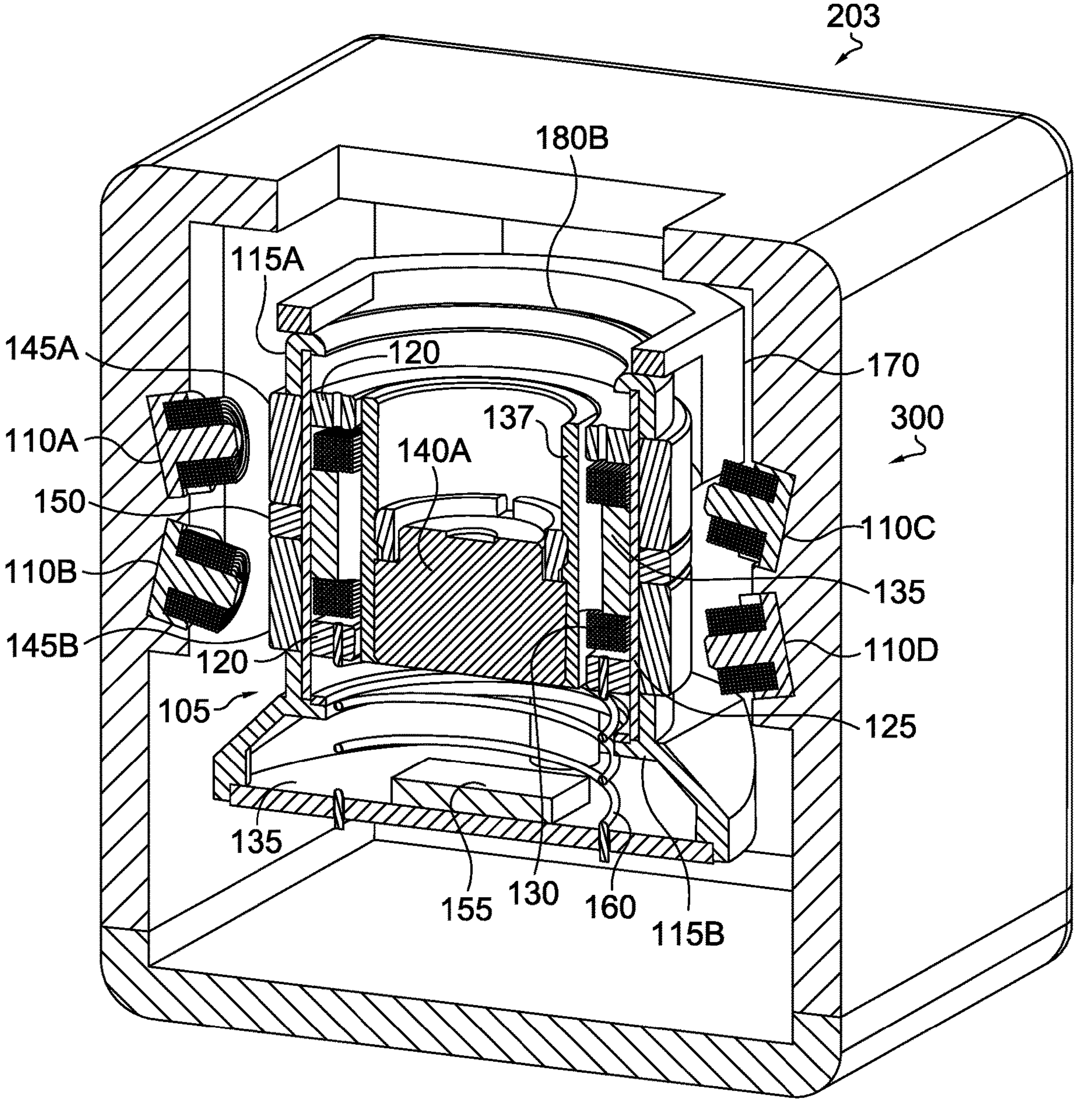
FIG. 3 is a cross-sectional view of a housing containing an imaging device with a translating lens in an intermediate position, implemented in accordance with an embodiment of the present invention.

In FIG. 3, imaging device 300 is located in housing 203. Imaging device 300 is the same as imaging device 200 except that imaging device 300 has a moving mechanism unit 180B located at an intermediate position and is not touching either abutment ring 115A or abutment ring 115B.

Figure 4:
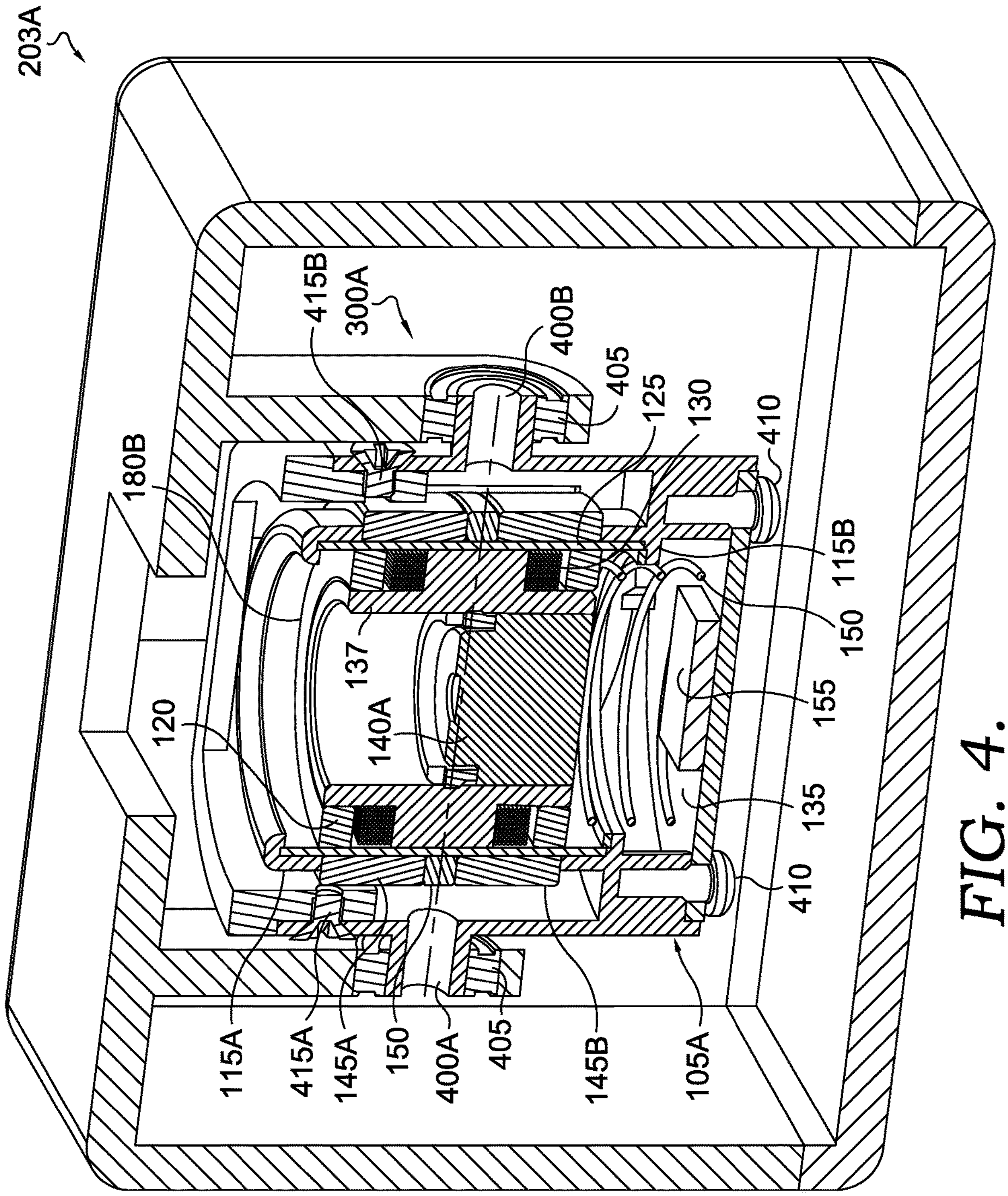
FIG. 4 is a cross-sectional view of a housing containing an imaging device with a translating lens in an intermediate position, where the cross-section is ninety (90) degrees to the cross-section in FIG. 3, implemented in accordance with an embodiment of the present invention.

FIG. 4 is another cross-sectional view of FIG. 3 where the view is ninety (90) degrees to the cross-sectional view in FIG. 3. As shown, electromagnets 110A, 110B, 110C, and 110D cannot be seen. However, holders 400A and 400B can be seen. Holders 400A and 400B provide holes of autofocus support for cables so that focusing device 105A can pivot about an axis when the cables are in place. Holders 400A and 400B are aligned along a rotational axis. Focusing device 105A is another view of focusing device 105. Likewise, an imaging device 300A in a housing 203*a* is another view of imaging device 300 in housing 203. Also, as one can see, moving mechanism unit 180B is located at the intermediate position and does not touch either abutment ring 115A or abutment ring 115B.

Additionally, FIG. 4 illustrates ball bearings 405 surrounding holders 400A and 400B. Screws 410 are used to attach printed circuit 153 to focusing device 105A. Screws 415A and 415B are used to attach balancing mass 170 to focusing device 105A.

Figure 5:
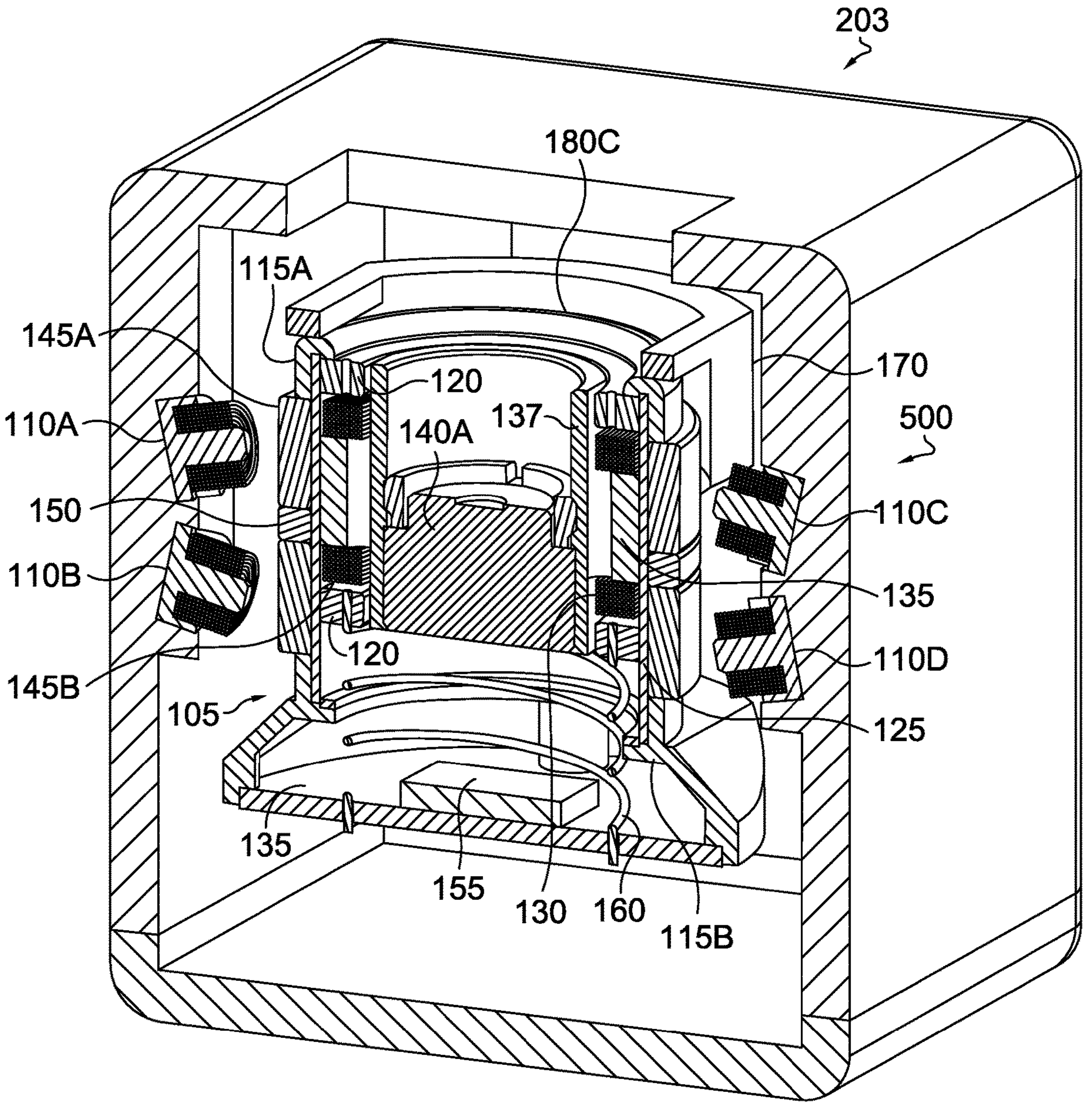
FIG. 5 is a cross-sectional view of a housing containing an imaging device with a translating lens in a maximum position, implemented in accordance with an embodiment of the present invention.

In FIG. 5, imaging device 500 is located in housing 203. Imaging device 500 is the same as imaging devices 200 and 300 except that imaging device 500 has a moving mechanism unit 180C located at a maximum position and is touching abutment ring 115A. In the maximum position, moving mechanism unit 180C is at its closest distance to abutment ring 115A and is farthest away from abutment ring 115B.

Figure 6:
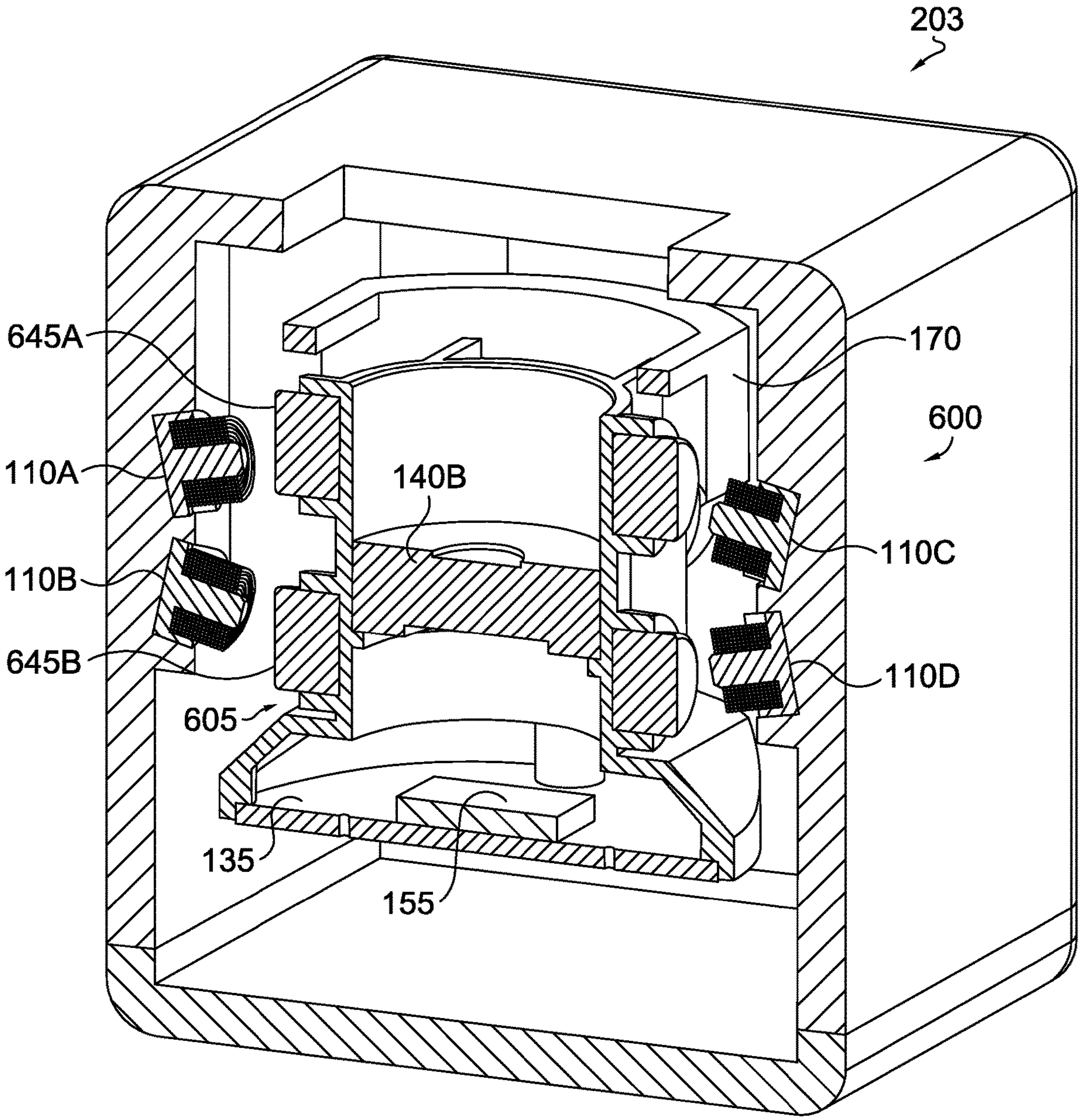
FIG. 6 is a cross-sectional view of a housing containing an imaging device with a liquid lens system, implemented in accordance with an embodiment of the present invention.

Turning now to FIG. 6, imaging device 600 is located in housing 203. Imaging device 600 is different from the previous imaging devices in that it has a focusing device 605 that has a liquid lens system 640. Because of this liquid lens system, there is no moving mechanism unit and no need to have an electromechanical device to control translating lens. As a consequence, there are no sliding bushings, guide, motion coils, support, abutment rings, or spacer. The autofocus feature can be accomplished through the liquid lens system. However, focusing device 605 has two pairs of magnets 645A and 645B. In embodiments of the present invention, magnets 645A and 645B have a cylindrical shape, are axially magnetized and are located radially around a cylindrical apparatus that supports the liquid lens system in an optical assembly.

Figure 7:
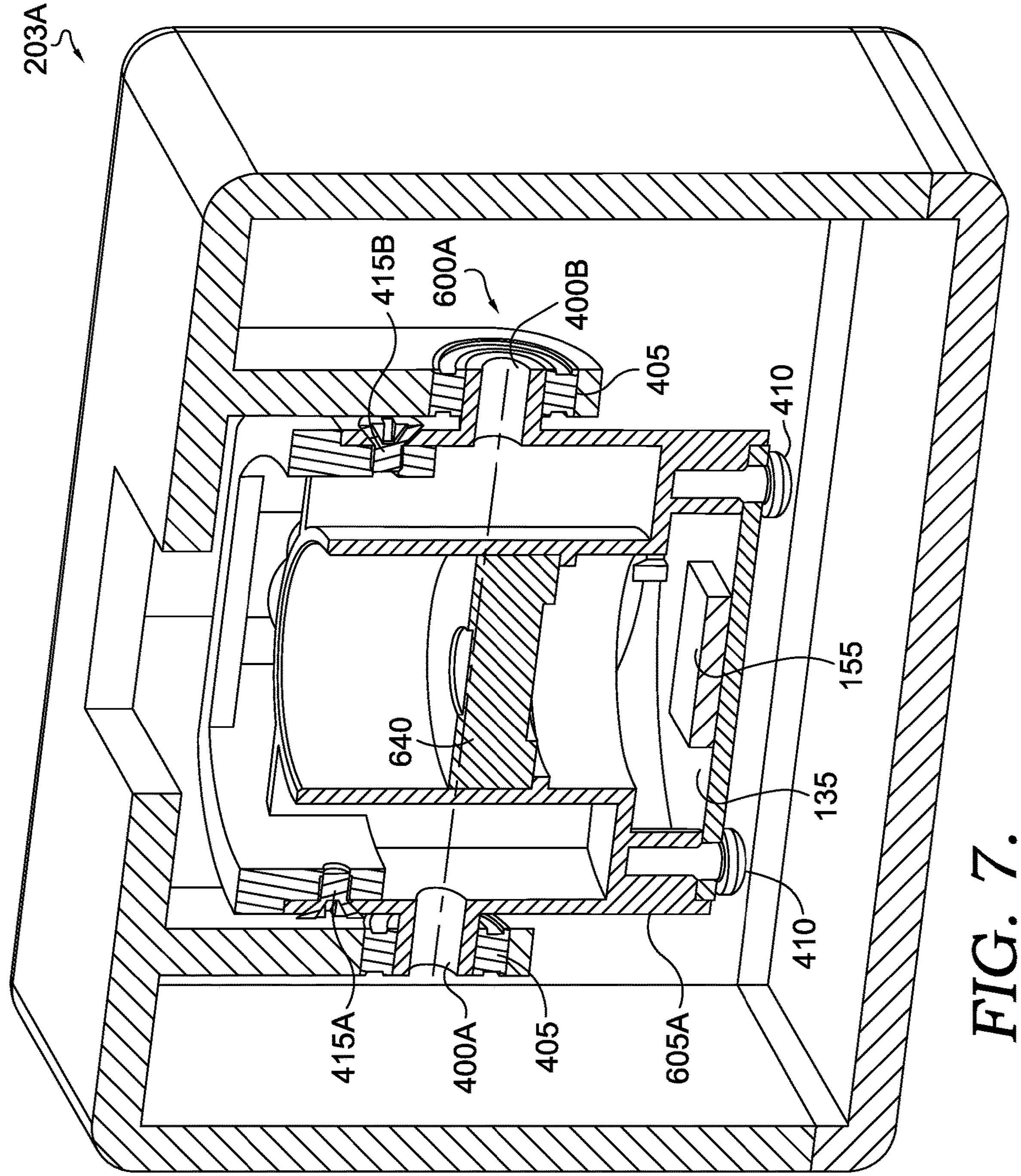
FIG. 7 is a cross-sectional view of a housing containing an imaging device with a liquid lens system, where the cross-section is ninety (90) degrees to the cross-section in FIG. 6, implemented in accordance with an embodiment of the present invention.

FIG. 7 is another cross-sectional view of FIG. 6 where the view is ninety (90) degrees to the cross-sectional view in FIG. 6. Holders 400A and 400B provide holes of autofocus support for cables so that focusing device 605A can pivot about an axis when the cables are in place. As stated above in the description of FIG. 4, holders 400A and 400B are aligned along a rotational axis. Focusing device 605A is another view of focusing device 605. Likewise, an imaging device 600A in a housing 203A is another view of imaging device 600 in housing 203. Also, FIG. 7 shows ball bearings 405 surrounding holders 400A and 400B. Screws 410 are shown, which attach printed circuit 153 to focusing device 605A. Screws 415A and 415B attach balancing mass 170 to focusing device 605A.

From an operational perspective of FIGS. 1-5, magnets 145A and 145B are radially magnetized with opposite polarities, glued to guide 125, and separated by spacer 150. A magnetic field crosses the coils in a direction orthogonal to the motion and closes in the air. Motion coils 130 are powered with opposite electric currents by means of conductive springs 160. Conductive springs 160 are welded to printed circuit 153 and fixed to sliding bushings 120. As a result, a Lorentz force is generated with direction of motion. Motion coils 130 are glued to a hollow cylindrical support 135, while sliding bushings 120 are inserted with interference into cylindrical support 135.

In some embodiments, with autofocus support 165, guide 125 is inserted with interference into autofocus support 165. Printed circuit 153 is fixed with screws 410 and balancing mass 170 is fixed with screws 415A and 415B. In other embodiments, guide 125, sliding bushings 120, and magnets 145A and 145B do not exist. This is the case when liquid lens system 640 is used in a focusing device. However, printed circuit 153 is still fixed with screws 410 and balancing mass 170 is fixed with screws 415A and 415B in embodiments that operate with liquid lens system 640.

The purpose of balancing mass 170 is to balance focusing device 105 (or focusing device 605) to a rotation and therefore reduce the electric consumption of electromagnets 110A, 110B, 110C, and 110D to maintain an autofocus orientation. The autofocus orientation is around the rotation axis by means of magnetic attraction/repulsion forces (magnetic levitation) between electromagnets 110A, 110B, 110C, and 110D and magnets 145A and 145B, in embodiments that employ translating lens 140A. In embodiments that employ liquid lens system 640, the magnetic levitation occurs between electromagnets 110A, 110B, 110C, and 110D and magnets 645A and 645B. Like magnets 145A and 145B, magnets 645A and 645B can be made of sintered neodymium iron boron, samarium cobalt (SmCo), alnico, or ceramic (i.e. ferrite).

Alternatively, the autofocus orientation can be obtained by means of a stepper motor and gears but this solution has two disadvantages: It is more expensive and slow. To reduce friction in the autofocus orientation, ball bearings 405 can be used. To minimize stresses and strains of cables for power supply and electrical signals, the cables are passed through holes 400A and 400B of autofocus support 165 on the rotation axis.

Figure 8C:
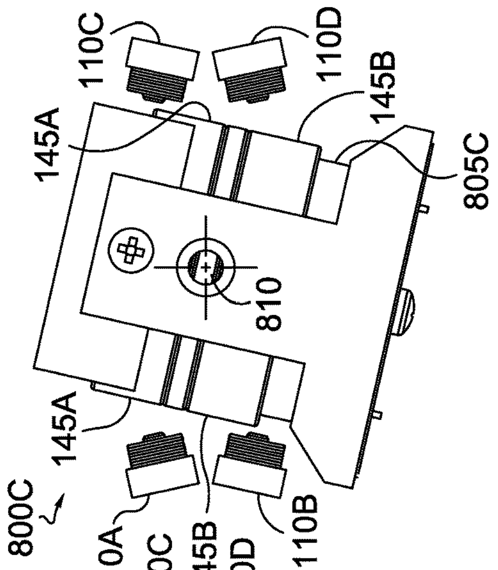
FIGS. 8A, 8B, 8C are orientation views of an imaging device, implemented in accordance with an embodiment of the present invention.
Figure 8B:
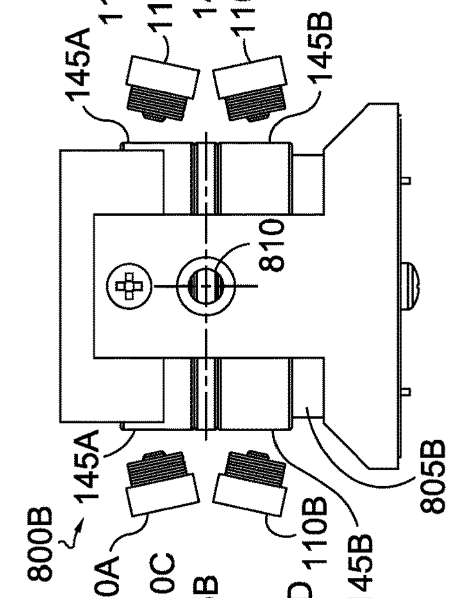
Figure 8A:
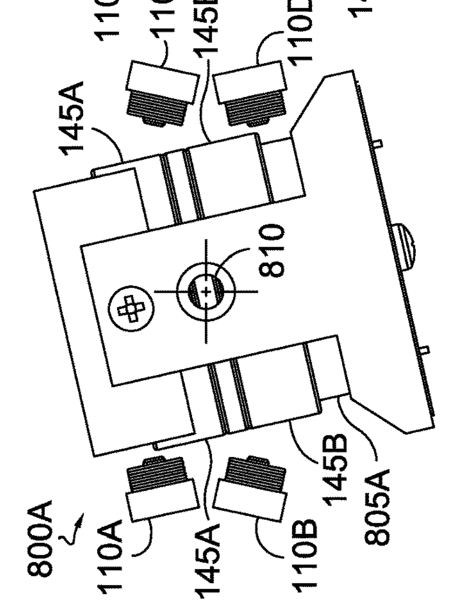

Turning now to FIGS. 8A, 8B, and 8C, various views are shown of the impact of magnetic levitation on an imaging device. In FIG. 8A, an imaging device 800A is shown with a focusing device 805A tilted due to the magnetic attraction (pull) between electromagnet 110A and magnet 145A and also between electromagnet 110D and magnet 145B. Likewise, magnetic repulsions occurs between electromagnet 110B and magnet 145B and between electromagnet 110C and magnet 145A. As a result of the magnetic attraction and repulsion, focusing device 805A pivots or rotates about the axis at axis 810.

When the electric current changes, the magnetic attraction and repulsion changes as shown with imaging device 800C. In FIG. 8C, a focusing device 805C tilts because of the magnetic attraction (pull) between electromagnet 110B and magnet 145B and also between electromagnet 110C and magnet 145A. Likewise, magnetic repulsions occurs between electromagnet 110A and magnet 145A and between electromagnet 110D and magnet 145B. Focusing device 805C rotates about axis 810.

FIG. 8B shows an exemplary illustration of imaging device 800B when magnetic levitation is balanced. In FIG. 8B, focusing device 805B stays in a stationary position that is equidistant between the electromagnets and has no rotation at axis 810.

Figure 9C:
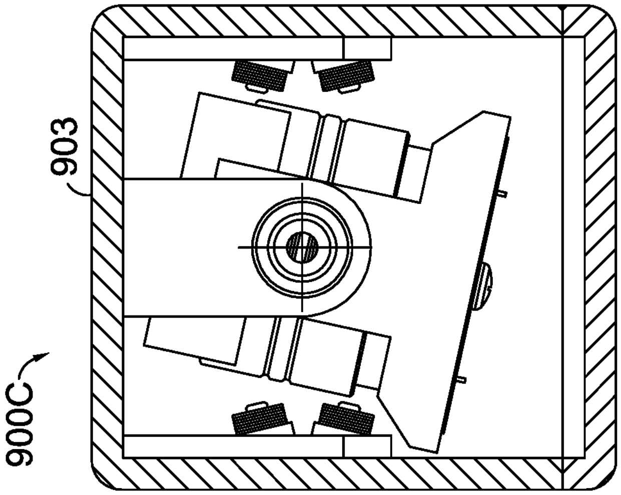
FIGS. 9A, 9B, 9C are orientation views of an imaging device in a housing and having a translating lens, implemented in accordance with an embodiment of the present invention.
Figure 9B:
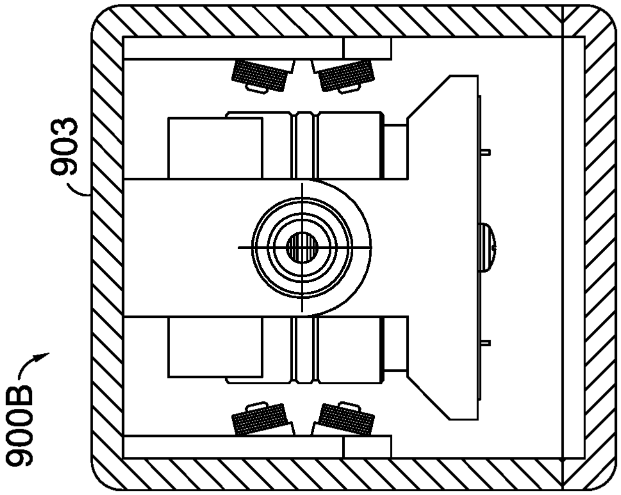
Figure 9A:
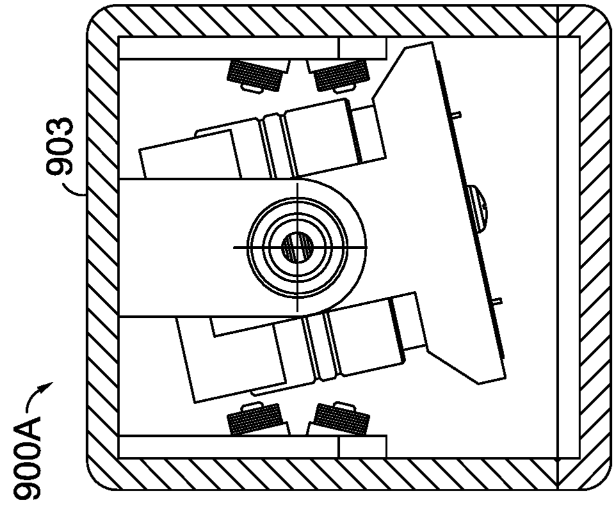
Figure 10A:
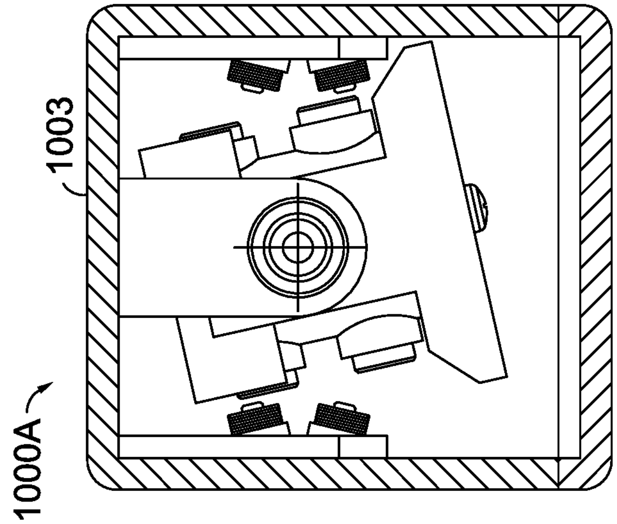
FIGS. 10A, 10B, 10C are orientation views of an imaging device in a housing and having a liquid lens system, implemented in accordance with an embodiment of the present invention.
Figure 10B:
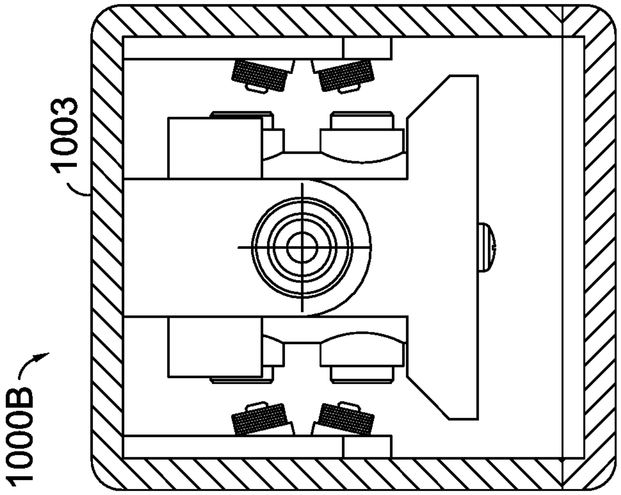
Figure 10C:
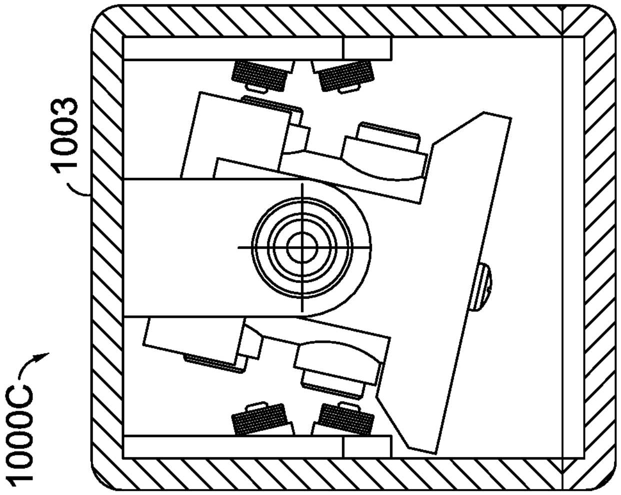

FIGS. 9A, 9B, 9C, 10A, 10B, and 10C show other illustrations of imaging devices being impacted by magnetic levitation. FIGS. 9A, 9B, 9C, 10A, 10B, and 10C show the imaging devices in a housing 903 and 1003 respectively, which is similar to housing 203. Although FIGS. 9A, 9B, 9C, 10A, 10B, and 10C look similar, FIGS. 9A, 9B, and 9C show exemplary illustrations of imaging devices that use a translating lens. Imaging devices in this configuration include focusing devices with more mechanical and moving parts. FIGS. 10A, 10B, and 10C show exemplary illustrations of imaging devices that use a liquid lens systems. As discussed above, imaging devices in this configuration implement less moving parts since the liquid lens system does not need to physically move to perform the autofocus.

Figure 11:
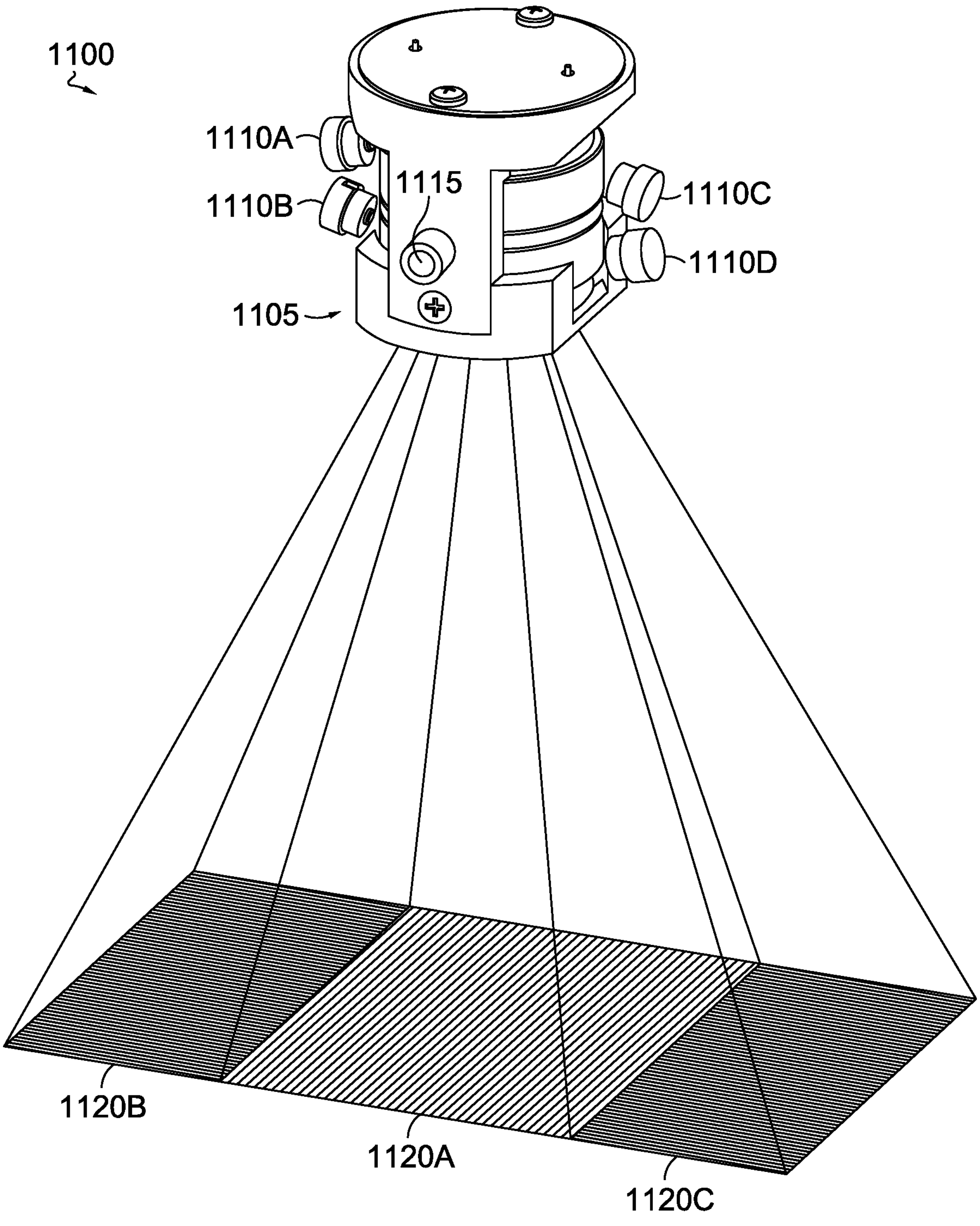
FIG. 11 is an exemplary view of an imaging device identifying a reading field and extended reading fields of the imaging device, implemented in accordance with an embodiment of the present invention.

Turning now to FIG. 11, an imaging device 1100 is shown with a focusing device 1105 and electromagnets 1110A, 1110B, 1110C, and 1110D. Electromagnets 1110A, 1110B, 1110C, and 1110D are the same as electromagnets 110A, 110B, 110C, and 110D. When imaging device 1100 is stationary and magnetic levitation is balanced, imaging device 1100 captures an image at a reading field 1120A. In this configuration, the optical axis of the optical assembly inside of focusing device 1105 is oriented perpendicular to reading field 1120A, causing the optical assembly to achieve a fixed autofocus. When magnetic levitation changes between the electromagnets and the magnets in focusing device 1105, focusing device 1105 rotates about an axis 1115 to tilt in either direction, resulting in imaging device 1100 capturing images at an extended reading field 1120B or an extended reading field 1120C. In this configuration, the rotation of focusing device 1105 yields extended reading field 1120B or 1120C, and focusing device 1105 achieves an orientable autofocus.

Figure 12:
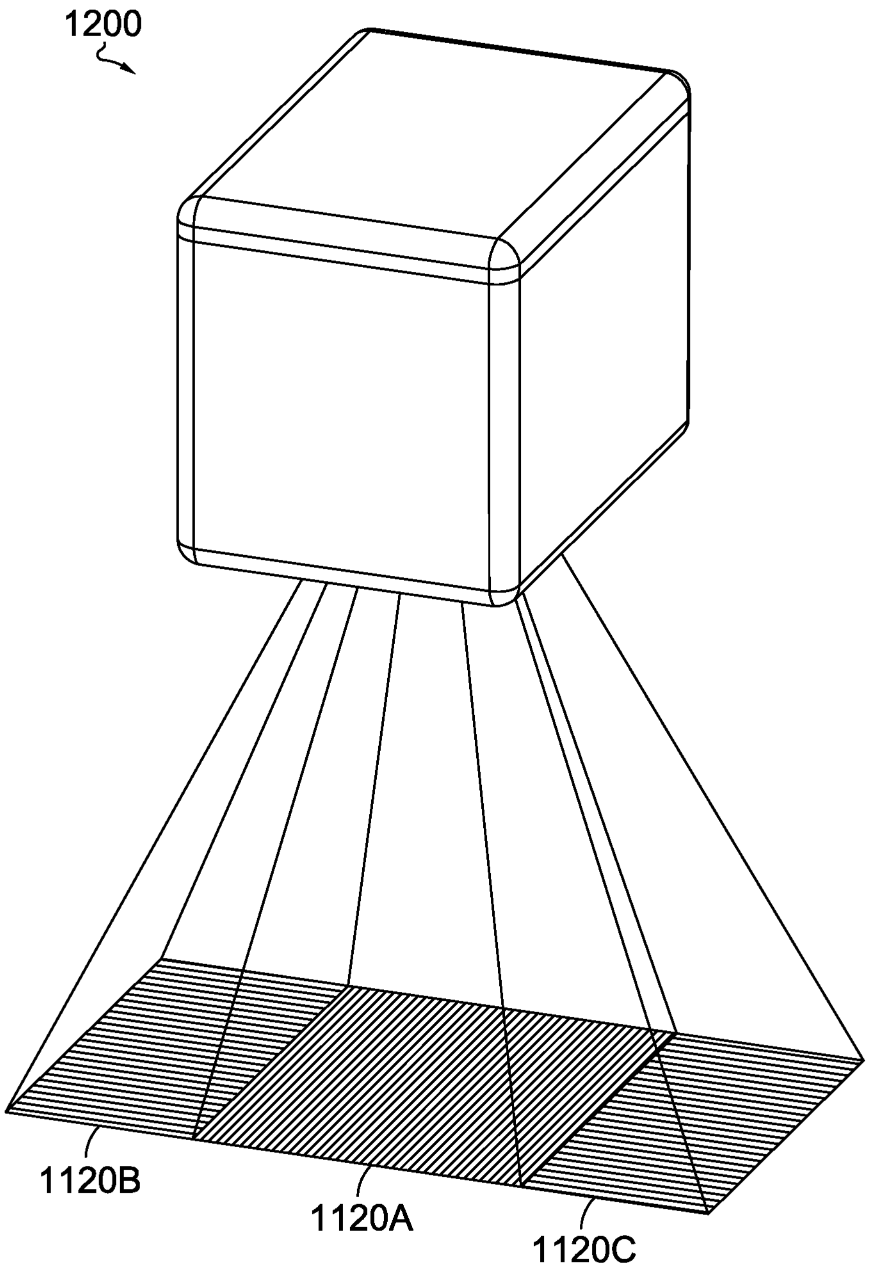
FIG. 12 is an exemplary view of a housing (containing an imaging device, not shown) identifying a reading field and extended reading fields of the imaging device, implemented in accordance with an embodiment of the present invention.

In FIG. 12, a housing 1200 includes an imaging device (not shown) similar to all the imaging devices discussed earlier, particularly imaging device 1100. Similar to the other imaging devices, the unseen focusing device 1105 can rotate due to magnetic levitation inside housing 1200. The result of the movement of focusing device 1105 can either be the capturing of the image at reading field 1120A with a fixed autofocus, or the capturing of the image at extended reading field 1120B or extended reading field 1120C with an orientable autofocus.

In conclusion, many different arrangements of the various components depicted, as well as components not shown, are possible without departing from the spirit and scope of embodiments of the present invention. Embodiments of the present invention have been described with the intent to be illustrative rather than restrictive. Certain features and sub-combinations are of utility and may be employed without reference to other features and sub-combinations and are contemplated to be within the scope of the claims.

What is claimed is:

1. An imaging device, comprising:

a focusing device that includes an optical assembly having one or more optical lens having an optical axis and configured to collect an image located at a distance at a reading field of the focusing device and transfers the image to an image sensor in the focusing device;

the focusing device being configured to be orientable about an axis in one or more positions, wherein:

when the focusing device is in a first position, the optical axis of the optical assembly in the focusing device is perpendicular to the reading field, when the focusing device is rotatable about the axis in a second position, the optical axis moves such that the optical axis is titled relative to its direction when the focusing device is in the first position to create an extended reading field from the movement of the optical axis, wherein the extended reading field is one or more adjacent areas to the reading field in a lateral direction;

a plurality of electromagnets located exterior to the focusing device;

at least two magnets placed around the optical assembly;

when the optical axis of the optical assembly in the focusing device is oriented perpendicular to the reading field, the optical assembly achieves a fixed focus;

the plurality of electromagnets and the at least two magnets create a magnetic levitation, which causes a rotation of the focusing device;

when the magnetic levitation causes the rotation of the focusing device at the axis, the rotation of the focusing device yields the extended reading field and the focusing device achieves an orientable focus in the one or more adjacent areas to the reading field.

2. The imaging device of claim 1, wherein the extended reading field is planar.

3. The imaging device of claim 1, wherein the at least two magnets have opposite polarities.

4. The imaging device of claim 3, wherein the at least two magnets are at least two ring magnets placed radially around the optical assembly.

5. The imaging device of claim 4, further comprising:

a ring spacer located between the at least two ring magnets, and wherein the pair of ring magnets and the ring spacer form a first cylindrical shape, wherein the at least two ring magnets are attached to an exterior of a cylindrical-shaped guide, wherein the pair of ring magnets and the ring spacer are adjacent to the cylindrical-shaped guide;

at least one motion coil located adjacent to an interior of the cylindrical-shaped guide, wherein the at least motion coil is in a second cylindrical shape;

at least one sliding bushing adjacent to the at least one motion coil and located adjacent to the interior of the cylindrical-shaped guide;

the at least one motion coil is attached to a cylindrical support that is located to the interior of the at least one motion coil, wherein the cylindrical support is also located to the interior of the at least one sliding bushing and includes the one or more optical lens;

the at least one sliding bushing is attached to one end of one or more conductive springs, and the other end of the one or more conductive springs is attached to the focusing device in proximity to the image sensor, wherein the at least one sliding bushing and the at least one motion coil move in a direction along the interior of the cylindrical-shaped guide when the at least one motion coil receives an electric current that passes through the one or more conductive springs;

when the at least one sliding bushing and the at least one motion coil move, the cylindrical support including the one or more optical lens also moves, wherein the at least one sliding bushing, the at least one motion coil, and the cylindrical support with the one or more optical lens move together as a unit, and wherein an amount of movement of the unit results in a focus of the reading field when captured at the image sensor.

6. The imaging device of claim 5, wherein the movement of the unit is limited by an end guide placed at an end of the cylindrical-shaped guide so as to limit a motion of the unit, and the end guide is made of rubber.

7. The imaging device of claim 5, wherein the at least one sliding busing comprises two sliding bushings, and wherein the at least one motion coil comprises two motion coils.

8. The imaging device of claim 7, wherein one sliding bushing and one motion coil are paired together located adjacent to the interior of the cylindrical-shaped guide, the other sliding bushing and the other motion coil are paired together located adjacent to the interior of the cylindrical-shaped guide, and the one sliding bushing and the one motion coil are separated from the other sliding bushing and the other motion coil.

9. The imaging device of claim 1, wherein the plurality of electromagnets are four electromagnets that are placed in a fixed position in a housing that includes the imaging device.

10. The imaging device of claim 1, wherein magnetic levitation includes a magnetic attraction or a magnetic repulsion.

11. The imaging device of claim 1, wherein the optical assembly is an electro-mechanical autofocus lens system.

12. The imaging device of claim 1, wherein the optical assembly is a fixed focus lens system that has a depth of focus and can capture in-focus images in the reading field and the extended reading field.

13. The imaging device of claim 1, wherein:

the at least two magnets placed around the optical assembly include two pair of cylindrical magnets that are axially magnetized and are located radially around a cylindrical apparatus;

the interior of the cylindrical apparatus includes a liquid lens system including the one or more optical lens;

a magnetic field crosses the two pair of cylindrical magnets in a direction orthogonal to the axis of the cylindrical apparatus;

the plurality of electromagnets are located at an exterior of the cylindrical apparatus and are also located in proximity to the two pair of cylindrical magnets such that magnetic levitation occurs between the electromagnets and the two pair of cylindrical magnets, wherein each of a first pair of electromagnets is located on the side of the first pair of cylindrical magnets and each of a second pair of electromagnets is located on the side of the second pair of cylindrical magnets.

14. The imaging device of claim 1, wherein:

when the magnetic levitation is balanced, causing a first pair of electromagnets and a second pair of electromagnets to be equidistant to achieve a fixed autofocus on the reading field; and when the magnetic levitation changes, causing the focusing device to move and rotate about the axis.

15. A method for creating an imaging device with an orientable focus for extension of a reading field, the method comprising:

configuring a focusing device in the imaging device with an optical assembly, further comprising capturing, through the optical assembly, an image located at a distance at a reading field of the focusing device;

orienting the optical assembly to extend the reading field in a lateral direction, which is perpendicular to an optical axis of the optical assembly when the focusing device is in a first position, wherein extending the reading field of the focusing device comprises rotating the focusing device about an axis to a second position such that the optical axis is tilted relative to its direction when the focusing device is in the first position, and wherein the axis of rotation of the focusing device is different than the optical axis;

locating a plurality of electromagnets in proximity to the optical assembly;

placing at least two magnets around the optical assembly, wherein the at least two magnets have opposite polarities;

orienting a line of sight of the focusing device perpendicular to the reading field to achieve a fixed focus; and creating a magnetic levitation between the plurality of electromagnets and the at least two magnets, wherein creating the magnetic levitation causes a rotation of the focusing device about the axis, and wherein rotating the focusing device yields an extension of the reading field and achieves an orientable focus in the extended areas beyond the reading field.

16. The method of claim 15, wherein connecting the plurality of electromagnets to the optical assembly comprises connecting four electromagnets.

17. The method of claim 15, wherein creating a magnetic levitation comprises creating a magnetic attraction or a magnetic repulsion.

18. The method of claim 15, wherein rotating the focusing device includes:

when the magnetic levitation is balanced, causing a first pair of electromagnets and a second pair of electromagnets to be equidistant to achieve a fixed autofocus on the reading field; and when the magnetic levitation changes, causing the focusing device to move and rotate about the axis.

19. The method of claim 15, wherein the optical assembly includes one or more lens.

20. The method of claim 15, wherein the optical assembly includes a liquid lens assembly.

* * * * *